March 9, 1954     R. H. SWAISGOOD     2,671,675
DETACHABLE COVER FOR TRAILER HITCHES
Filed Jan. 7, 1950
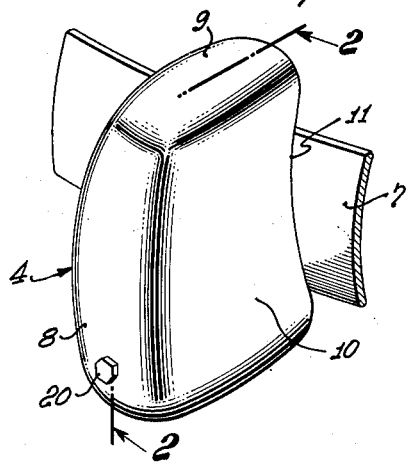
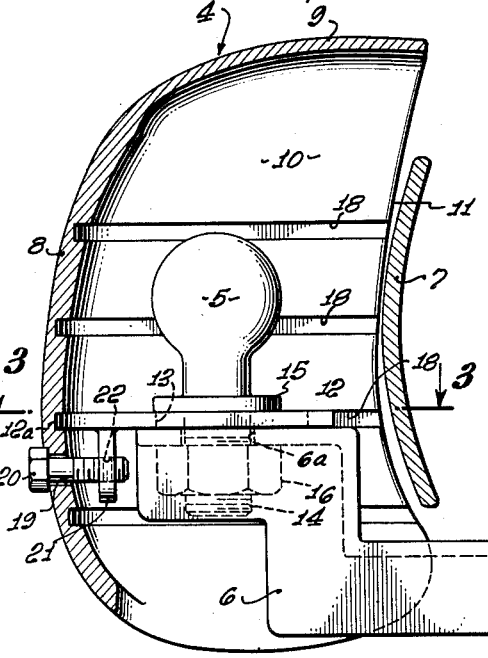
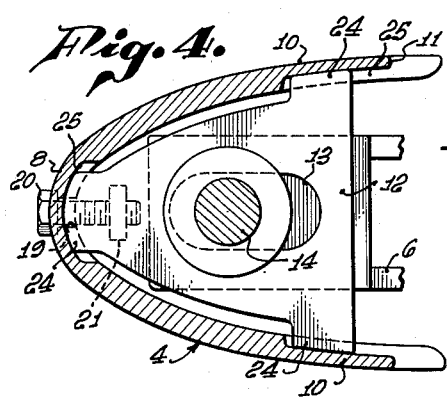
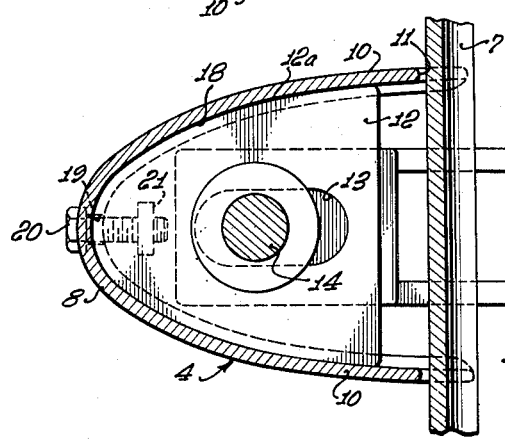
RALPH H. SWAISGOOD,
INVENTOR.
BY
Paul A. Weilein
ATTORNEY.

Patented Mar. 9, 1954

2,671,675

UNITED STATES PATENT OFFICE 2,671,675

DETACHABLE COVER FOR TRAILER HITCHES

Ralph H. Swaisgood, Covina, Calif.

Application January 7, 1950, Serial No. 137,365

11 Claims. (Cl. 280—507)

1

This invention relates to improvements in trailer hitches for automobiles and similar vehicles; more particularly it relates to a protective guard or housing for such hitches.

Trailer hitches as presently fixed on automobiles are objectionably exposed when not in use, in that the draw bar projects beyond the automobile bumper, mounting the hitch ball at its outer end, and is most unsightly. The ball and end portion of the draw bar are frequently covered with grease, and therefore become a clothes-soiling as well as an injury hazard for persons walking adjacent thereto or seeking access to the trunk or rear compartment of the car. Moreover, in projecting beyond the bumper, the hitch is likely to become bent, or otherwise damaged.

It is an important purpose of this invention to provide a removable guard or housing for covering and protecting the trailer hitch of an automobile so as to eliminate the objections above noted.

Another purpose of my invention is the provision of a guard or housing such as described having a pleasing and ornamental exterior, and which is adapted to serve as part of the bumper.

Additionally, it is an object hereof to provide a novel mounting means for the guard which makes it possible readily to mount the guard in different adjusted vertical and horizontal positions in accordance with needs of the particular hitch.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a front elevational view of the trailer hitch guard as in use;

Figure 2 is a vertical sectional view taken on the line 2—2 of Figure 1;

Figure 3 is a horizontal sectional view taken on the line 3—3 of Figure 2; and

Figure 4 is a view similar to Figure 3, but showing a modified form of the invention.

In accordance with this invention, I provide as shown in the accompanying drawing, a trailer hitch guard or cover in the form of a vertically elongated housing or shell 4 of steel, aluminum, or other appropriate material, shaped to effectively cover and protect the ball element 5 and draw bar 6 of a trailer hitch unit fixed to an automobile, while the unit is not in use.

Preferably the housing 4 is rounded or otherwise shaped to afford ornamentation in harmony with the style of the associated bumper 7 of the automobile and so that it will serve as an auxiliary part thereof.

The housing 4 is mounted in place with its major axis vertically disposed, and as here shown has rounded and convex rear, top and opposed side walls 8, 9 and 10 respectively, but is open on its forward side and at the bottom thereof to facilitate placement over and removal from the hitch and access to the mounting means for the housing.

As it is adapted to abut the bumper or as here shown to be disposed close thereto, the housing 4 has the free edges 11 of the side walls 10 shaped generally to conform to the bumper 7. In this connection, it is to be understood that the shape and contour of the housing may be varied as desired provided, the housing will have the guarding, concealing and auxiliary bumper qualities herein noted.

Means are provided for removably and adjustably mounting the housing 4 in place and includes an elongated mounting plate 12 adapted to lie flatwise on the draw bar 6 as shown in Figure 2. This plate has a longitudinal slot 13 through which the threaded shank 14 of the ball 5 extends and thence through an opening 6-a in the draw bar 6. The plate 12 also has a depending lug 21 near its outer end, secured by welding or otherwise, and having a threaded opening 22. The flange 15 of the ball 5 rests on the plate 12 serving to clamp the plate 12 against movement when the nut 16 for securing the ball 5 in place is tightened. The slot 13 affords adjustment of the plate 12 forwardly and rearwardly best to support the housing 4 for the particular hitch and bumper arrangement, as will be hereinafter described.

As the relative positions of the ball 5, draw bar 6 and bumper 7, vary with different automobiles, it is necessary to adjust the position of the housing 4 vertically as well as horizontally in order to cover the particular hitch and have the housing serve as a part of and match the particular bumper. For this purpose, the housing 4 is provided at vertically spaced points interiorly thereof with spaced horizontal grooves 18 in the rear and side walls 8 and 10 respectively, any one of which will accommodate the plate 12, the plate being shaped to conform to the cross sectional shape of the housing 4. Thus, the housing 4 is mounted with that groove 18 engaging the plate 12 which will position the housing 4 in accordance with the needs of the particular hitch installation. In this instance, the cross section of the housing 4 is generally convergent toward its rear wall 8, so that the housing will have a wedging action with the plate 12 when drawn thereagainst by means presently to be described.

The forward and rearward adjustment of the plate 12 as afforded by the slot 13, makes it possible to move the plate horizontally to the position best suited to the particular bumper and hitch installation, that is, to bring the rear edges 11 of the housing 4 into the desired relation to the outer face of the bumper.

When the housing 4 is mounted on the plate 12 at the proper position or level to suit the particular bumper and hitch, or when this position is determined in any suitable manner, a hole 19 is drilled through the front wall 9 in alignment with the threaded opening 22 and a bolt 20 is inserted, serving to draw the housing 4 tightly against the plate 12.

Once the plate 12 is set in the proper position on the draw bar 6, it need not be adjusted again and the housing 4 may be mounted at will upon appropriate manipulation of the single bolt 20.

In that form of the invention just described, the plate 12 has a continuous marginal or edge portion 12-a substantially coextensive with the grooves 18. It is not essential however, that the groove engaging edge be continuous, but may comprise a series of spaced lugs or marginal projections such as indicated by 24 in Figure 4, three being shown by way of example. Further, if a plate having spaced lugs is to be used, the grooves in the housing may be similarly discontinuous, providing a plurality of recesses or pockets 25 for the respective lugs 24.

With reference to the foregoing description and accompanying drawing, it will be apparent that I have provided a novel and useful trailer hitch guard which serves not only as a means for covering and protecting the hitch while the latter is not in use but also as a part of the bumper.

The comparatively heavy construction of the housing and its associated mounting means and the manner in which the edges of the plate 12 fit in the grooves 18 of the housing assure that the housing will effectively withstand the impacts and shocks such as occasioned by automobile bumpers.

I claim:

1. In a guard for a trailer hitch: a guard element for protecting said hitch when not in use, a mounting member adapted to be secured to said hitch, and a plurality of vertically spaced grooves on said element, optionally engageable with said member to support said element in vertically adjusted position.

2. In a guard for a trailer hitch: a hollow element having rear and side walls as well as a top, and open at its forward end, for partly enclosing and covering said hitch when not in use, a plate-like horizontally disposed mounting member secured to said hitch, there being a plurality of vertically spaced horizontal grooves in said walls, optionally engageable with the marginal portion of said member to support said element in vertically adjusted position.

3. In a guard for a trailer hitch: a hollow element having rear and side walls as well as a top, and open at its forward end, for partly enclosing and covering said hitch when not in use, a plate-like horizontal mounting member secured to said hitch for adjustment longitudinally thereof, there being a horizontal groove in said walls engageable with the marginal portion of said member for supporting said element in fixed relation with said member, and means detachably securing said element to said member, whereby longitudinal adjustment of said member adjusts said element in a horizontal direction with respect to said hitch.

4. In a guard for a trailer hitch: a hollow element having rear and side walls as well as a top, and open at its forward end, for partly enclosing and covering said hitch when not in use, a plate-like horizontally disposed mounting member secured to said hitch, there being a plurality of vertically spaced horizontal grooves in said walls, optionally engageable with the marginal portion of said member to support said element in vertically adjusted position, and means extending through said rear wall in fixed vertical spaced relation with said member for detachably securing said element and said member in assembled relation.

5. In a guard for a trailer hitch: a hollow element having rear and side walls, as well as a top and open at its forward end, for partly enclosing and covering said hitch when not in use, a horizontal plate-like mounting member secured to said hitch and having a substantially continuous marginal portion, there being a horizontal groove in said walls engageable with said marginal portion for supporting said element in fixed relation with said member, and means detachably maintaining said member and said element in assembled relation.

6. In a guard for a trailer hitch: a hollow element having rear and side walls, as well as a top and open at its forward end, for partly enclosing and covering said hitch when not in use, a horizontal plate-like mounting member secured to said hitch and having spaced marginal projections, means in said walls for receiving said projections, whereby to support said element in fixed relation with said member, and means detachably maintaining said member and said element in assembled relation.

7. In a guard for a trailer hitch: a hollow element having a rear wall and converging side walls, and open at its forward end, for partly enclosing and covering said hitch when not in use, a plate-like mounting member secured to said hitch and having a correspondingly converging marginal portion, there being a horizontal groove in said walls engageable with said marginal portion for supporting said element in fixed relation with said member, and threaded means detachably connecting said element and said member and adapted to urge said member to bring its marginal portion into wedging relation with said groove.

8. In a guard for a trailer hitch: a vertically elongated shell open at its forward end and having rear and side walls for partly enclosing and protecting said hitch when not in use, and means for mounting said shell comprising, a member secured to said hitch for adjustment in a substantially horizontal direction with respect thereto, a plurality of vertically spaced, transversely disposed grooves in said walls, optionally engageable with margins of said member to support said shell in adjusted vertical position with respect to said hitch, and means for detachably securing said shell to said member.

9. In a trailer hitch guard, a housing for covering and concealing a trailer hitch on an automobile while the hitch is not in use, and mounting means affording the removable attachment of the housing to the hitch, including a mounting member, means for adjustably mounting said member on the hitch for movement inwardly or outwardly from the hitch, means for clamping said member in adjusted position, said housing having a groove interiorly thereof for reception of an edge of said member, and fastening means for securing the housing to said mounting member.

10. In a trailer hitch guard, a housing for covering and concealing a trailer hitch on an automobile while the hitch is not in use, and mounting means affording the removable attachment of the housing to the hitch, including a mounting plate mounted on the hitch for movement outwardly or inwardly relative thereto, said housing having a groove interiorly thereof for reception of said plate, and fastening means for securing the housing to said plate, with said plate disposed in entirety within said housing.

11. In a guard for an automobile trailer hitch, said hitch being adjacent the automobile bumper; a guard member for covering the ball element of the hitch, said member having rear and side walls and being open at its forward end, the forward edges of said side walls being opposed to said bumper and relieved in accordance with the configuration of the bumper, a plate adjustable horizontally on said hitch and disposed within said guard member, in inwardly spaced relation to said forward edges, interengaging portions on the interior of said guard member and edges of said plate respectively, and means for fastening the guard member to said plate including a lug extending from said plate at a point spaced inwardly from said interengaging portions.

RALPH H. SWAISGOOD.

References Cited in the file of this patent
UNITED STATES PATENTS

| Number | Name | Date |
|---|---|---|
| 2,342,907 | Stall | Feb. 29, 1944 |
| 2,464,423 | Walkowiak | Mar. 15, 1949 |